United States Patent [19]

Sandberg

[11] Patent Number: 4,768,260
[45] Date of Patent: Sep. 6, 1988

[54] FOOD PATTY MOLDING MACHINE

[75] Inventor: Glenn A. Sandberg, Lockport, Ill.

[73] Assignee: Alfa-Laval AB, Stockholm, Sweden

[21] Appl. No.: 106,249

[22] Filed: Oct. 7, 1987

[51] Int. Cl.⁴ .............................................. A22C 7/00
[52] U.S. Cl. ...................................... 17/32; 425/236; 425/556
[58] Field of Search ................... 17/32; 425/236, 256, 425/261, 556, 587

[56] References Cited

U.S. PATENT DOCUMENTS

| Re. 3,096 | 9/1979 | Richards | 17/32 |
|---|---|---|---|
| 3,623,188 | 11/1971 | Holly | 17/32 |
| 3,913,175 | 10/1975 | Peterson | 17/32 |
| 4,054,967 | 10/1977 | Sandberg et al. | 17/32 |
| 4,182,003 | 1/1980 | Lamartino et al. | 17/32 |
| 4,276,318 | 6/1981 | Orlowski et al. | 17/32 X |
| 4,298,326 | 11/1981 | Orlowski | 17/32 X |
| 4,329,828 | 5/1982 | Wagner | 53/122 |
| 4,338,702 | 7/1982 | Holly | 17/32 |
| 4,516,291 | 5/1985 | Goldberger et al. | 17/32 |
| 4,597,134 | 7/1986 | Wagner | 17/32 |
| 4,615,076 | 10/1986 | Shimokawa | 17/32 |
| 4,646,385 | 3/1976 | Roberts et al. | 17/32 X |

Primary Examiner—Willie G. Abercrombie
Attorney, Agent, or Firm—Kinzer, Plyer, Dorn, McEachran & Jambor

[57] ABSTRACT

A food patty molding machine of the horizontally reciprocating mold plate type, using a plunger type food pump, has its food product storage hopper set off to one side, horizontally offset from the mold plate and its drive and also clear of the food pump plunger and its drive; the mold plate and plunger pump drives are also offset horizontally as well as vertically so that the pump feed path is an offset V and there is clear access to the mold plate, to the food pump plunger, and to their drives for both machine changeover and maintenance purposes. All machine operations are driven by fluid pressure drive motors to facilitate changes in the overall time of the machine cycle by varying only one operating interval, preferably the dwell of the machine occurring immediately after knock-out.

5 Claims, 5 Drawing Sheets

FOOD PATTY MOLDING MACHINE

BACKGROUND OF THE INVENTION

There are several high efficiency, high volume food patty molding machines available for production of hamburger patties, other ground meat patties, chicken patties, fish patties, imitation steaks, and other food product patties. Three such machines that are commercially available are described in Richards et al U.S. Pat. No. Re. 30,096, Sandberg et al U.S. Pat. No. 4,054,967, and Lamartino et al U.S. Pat. No. 4,182,003, which are available as the F-26, F-19, and F-12 food patty molding machines, respectively, made and sold by Formax, Inc. of Mokena, Illinois. All of those machines are quite flexible; each can produce virtually any form of food patty desired, depending entirely upon the mold plate and other mold station components mounted in the machine. However, none of those machines is particularly satisfactory for experimental uses that require production of only a few patties having particular characteristics from a given food product or that may require frequent and rapid changeover of the mold plate and other molding station components of the machine. Furthermore, the high volume machines are not adapted for use as production tools for low volume users, such as individual retail outlets or small groups of retail producers, particularly if the patties produced must be varied frequently. Moreover, the high efficiency high volume machines are not well adapted to changes in their production rates, as might be required to match speeds with other equipment such as cheese applicators and the like.

SUMMARY OF THE INVENTION

It is a principal object of the present invention, therefore, to provide a new and improved molding station for a low volume food patty molding machine that can be changed rapidly from one product to another and hence is satisfactory for both experimental use and for use by a low volume facility in which patty requirements change frequently.

Another object of the invention is to provide a new and improved molding station for a low volume food patty molding machine that can be adapted to any production rate within a broad range, facilitating matching its production speed to the requirements of external equipment.

An additional object of the invention is to provide a new and improved molding station for a low volume food patty molding machine that is highly versatile in operation yet capable of functioning over long periods of time with minimum maintenance.

Accordingly, the invention relates to the molding station of a food patty molding machine of the kind comprising a storage hopper for storing a quantity of a moldable food material, hopper feed means for urging the food material from the storage hopper into a feed passage, piston-type pump means including a plunger and a plunger drive for reciprocally moving the plunger along a predetermined pump plunger path, for receiving the food material from the feed passage and pumping the food material into and through a fill passage, a mold plate, and mold plate drive means for moving the mold plate cyclically and reciprocally along a predetermined generally horizontal mold plate path between a fill position and a knock-out position, the mold plate having at least one mold cavity for receiving food material pumped thereinto from the fill passage when the mold plate is in its fill position.

In the improved construction for the molding station, the pump plunger path is located below and generally parallel to the mold plate path and is horizontally displaced from the mold plate path, and the fill passage extends angularly upwardly from the output end of the pump plunger path to the fill position of the mold plate path, in a direction transverse to the mold plate path, so that the mold plate path is clear of the pump plunger path for vertical and horizontal access to both. Further, the hopper is positioned above and horizontally displaced from the pump plunger path so that it is clear of both the plunger and the mold plate and their drives.

DESCRIPTION OF THE PREFERRED EMBODIMENT

Figure 1:
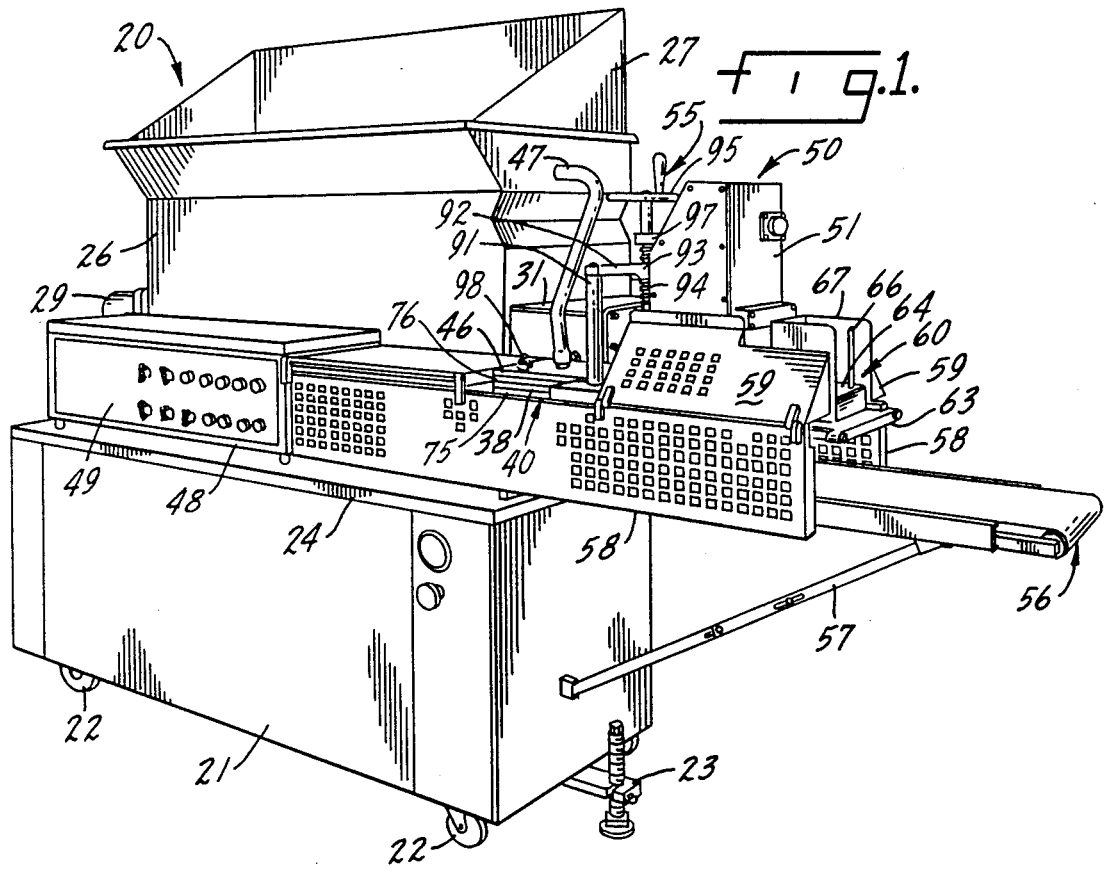
FIG. 1 is a perspective view of a food patty molding machine incorporating a preferred embodiment of the present invention.
Figure 2:
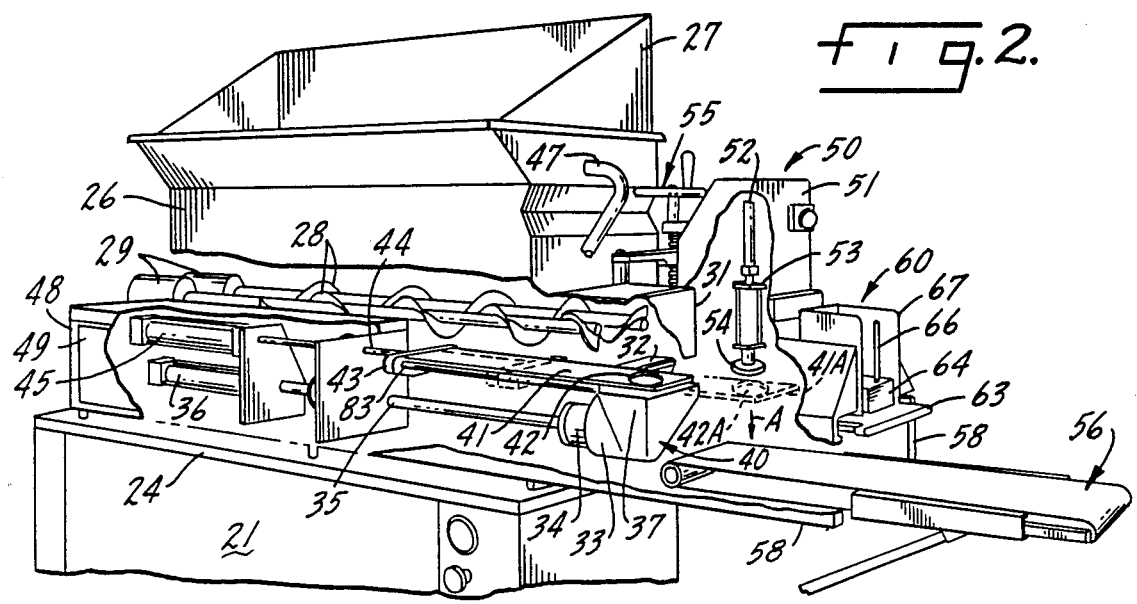
FIG. 2, is a partially schematic perspective view of the patty molding machine, like FIG. 1, with exterior housings and covers cut away to disclose principal operating components of the machine.

The food patty molding machine 20 illustrated in FIGS. 1 and 2 incorporates a patty molding station 40 constructed in accordance with a preferred embodiment of the present invention. Patty molding machine 20 is a relatively small machine, typically producing just one molded food patty in each cycle of operation. On the other hand, machine 20 may operate at a relatively high cycle rate, up to sixty-five molding cycles or strokes per minute or even more. It should be understood, however, that the basic mechanism of molding station 40 is not limited to use in a small patty molding machine such as machine 20. On the contrary, the patty molding mechanism can be expanded in size, utilizing the same elements and functioning in accordance with the same operating cycle to produce the same results, in a substantially larger patty molding machine.

Food patty molding machine 20 has a base 21 mounted upon casters 22. Base 21 is also provided with a floor-engaging positioning mechanism 23 so that one end of the machine can be elevated and maintained in a fixed position in a production facility. Much of the operating mechanism of food patty molding machine 20 is located above the top 24 of its base 21. A food product hopper 26 extends along one side of the top of base 21. Hopper 26 may have a capacity of the order of 6.5 cubic feet. On a larger, multi-cavity patty molding machine, of course, the hopper 26 is likely to be substantially larger. A deflector or shield 27 is mounted at the open top of hopper 26 to guide meat, fish, or other food product into the hopper.

As shown in FIG. 2, two feed screws 28 extend longitudinally of the bottom of hopper 26. Feed screws 28 are driven by two hydraulic motors 29. The feed screws impel ground meat or other food product horizontally along the bottom of the hopper and into a short, low hopper extension enclosure 31 that encompasses the ends of feed screws 28 remote from their drive motors 29.

Hopper extension 31 comprises the input to molding station 40. The hopper extension is positioned immediately above a feed passage 32 that leads downwardly and laterally into the cylinder of a plunger-type food product feed pump 33. The piston or plunger 34 of feed pump 33 is connected to a drive rod 35 that extends to and is operationally connected to a hydraulic drive cylinder 36. The outlet for pump 33 is a fill passage 37 that extends upwardly and laterally from the pump cylinder, through a fill plate 75 and into alignment with the bottom of a reciprocating mold plate 41. Mold plate 41, as illustrated in FIG. 2, incorporates only a single mold cavity 42; several could be used. In a larger machine the mold plate may well include a substantial number of mold cavities. Mold plate 41 is affixed to an inner yoke 43 that connects the mold plate to a drive rod 44. The mold plate drive rod 44, in turn, is connected to and driven by a hydraulic mold plate drive cylinder 45.

As shown in FIG. 1, machine 20 includes a cover plate 46 that is mounted over a breather plate 76 positioned immediately above mold plate 41, the mold plate being positioned between fixed spacers 38. A conduit 47 is connected to cover plate 46 to afford a return or relief path for air pressure and minute amounts of food product from the mold station cover space back into hopper 26. A housing 48 encompasses the pump and mold plate drive cylinders 36 and 45; the front panel 49 of housing 48 is conveniently utilized as the control panel for machine 20.

Patty molding machine 20 further comprises a knock-out mechanism 50. The knock-out mechanism 50 includes a pneumatic cylinder 52 (FIG. 2) supported within a housing 51. A yoke 53 connects the drive rod of cylinder 52 to a knock-out cup 54 having the same size and configuration as mold cavity 42 but slightly smaller. A knock-out and mold lift assembly 55 is positioned between knock-out housing 51 and hopper 26, and provides for rapid and convenient change of mold plate 41 and related components in molding machine 20. Machine 20 further comprises a discharge or takeway conveyor 56 that has one end positioned below knock-out cup 54. The other end of conveyor 56 projects outwardly to provide for removal of food patties produced by machine 20. Conveyor 56 is supported by a strut 57. A part of conveyor 56 and other portions of the operating mechanism for machine 20 are covered and protected by a pair of elongated guard plates 58 removably mounted on opposite sides of the machine. Two smaller, pivotally mounted guard plates 59 preclude inadvertent access to knock-out mechanism 51, mold plate 41, and the operating components of a paper interleaver 60.

Paper interleaver 60, which is an optional part of machine 20 and may be omitted in some installations, includes a stack 64 of paper sheets disposed on a fixed support 63, aligned by means of a spindle 66 and a sheet metal guide 67. Interleaver 60 further comprises a vacuum shuttle (not shown) that is mechanically connected to and movable with the mold plate 41. That shuttle shifts one sheet of paper from stack 64 to a transfer position below knock-out cup 54 in each cycle of machine 20; at the transfer position the sheet is transferred to a fixed vacuum-operated frame and held until dislodged by a falling food patty. Paper interleaver 60 is described and claimed in the co-pending United States patent application of Scott A. Lindee and Wilbur A. Janssen, Ser. No. 106,128, filed concurrently herewith and assigned to the same assignee as the present application.

As thus far described, patty molding machine 20, apart from the unusual arrangement of hopper 26, pump 33, and the feed/fill path from hopper 26 to mold cavity 42, molding station 40, is generally conventional. Thus, when machine 20 is placed in operation, a substantial quantity of ground meat, chicken, fish, or other food product is loaded into the open top of hopper 26, with deflector 27 helping to assure against loss of the food product. The food product is conveyed across the bottom of hopper 26 by feed screws 28 and fills the short, low hopper extension 31. Continuing operation of feed screws 28 impels a supply of food product downwardly into feed passage 32, toward the pump chamber of feed pump 33. In subsequent operations, rapid cyclic withdrawal of plunger 34 from the cylinder of pump 33 draws food product, by vacuum, into the pump chamber.

In each cycle of operation of machine 20 there is an interval when, mold plate 41 occupies in the retracted "fill" position shown in phantom solid lines in FIG. 2, a position in which mold cavity 42 is located immediately above the fill passage 37 that is the outlet for pump 33. In each cycle there is a dwell interval for mold plate 41 with cavity 42 at the fill position over passage 37. In this fill position, mold cavity 42 is filled with meat or other food product pumped upwardly through passage 37.

Figure 7:
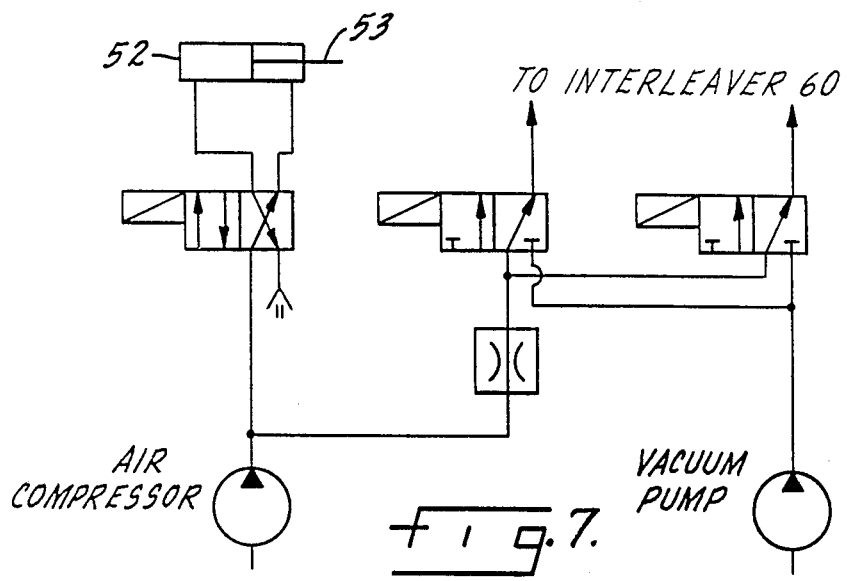
FIGS. 7 and 8 are simplified schematics of pneumatic and hydraulic systems, respectively, for the patty molding machine.
Figure 8:
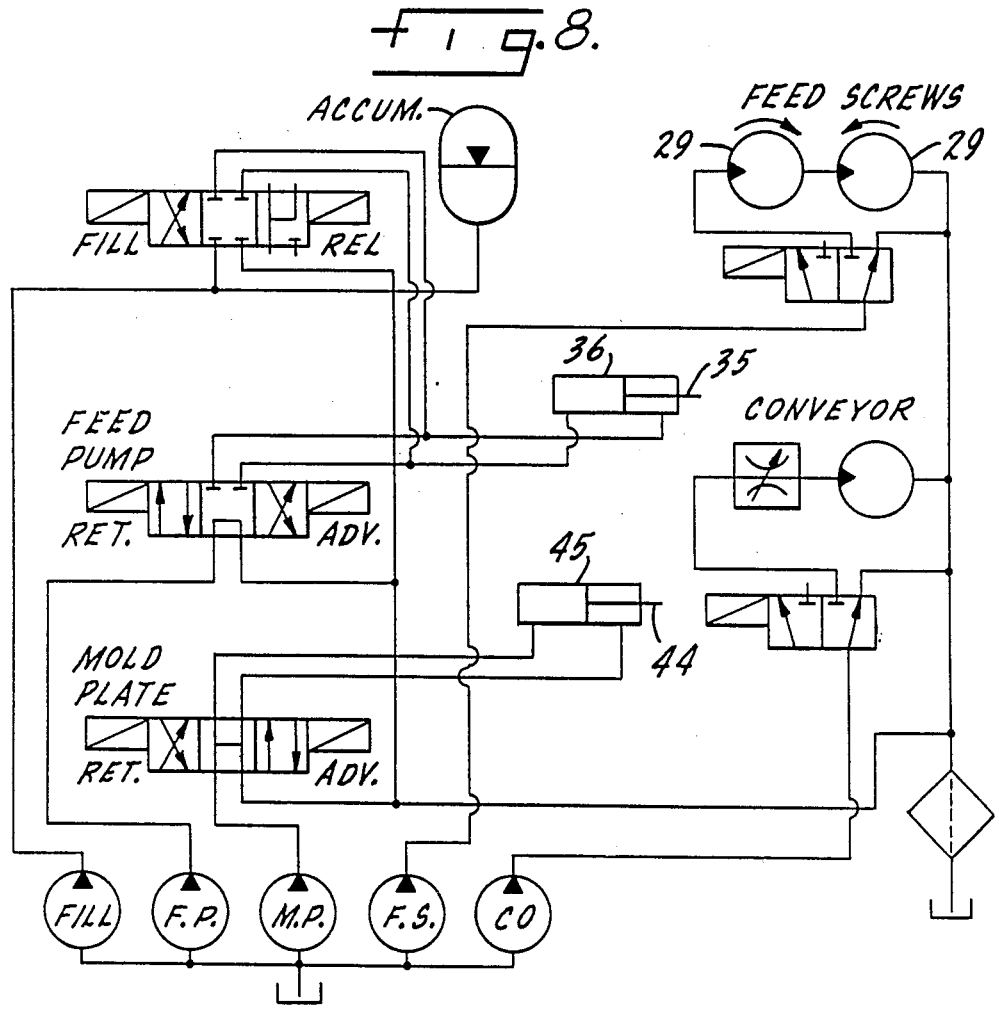

When mold cavity 42 is filled, as a continuing part of the operating cycle, piston 45 is actuated to drive the mold plate outwardly from the position shown in solid lines in FIG. 2 to the position indicated by phantom line 41A, with its filled mold cavity in a position 42A aligned accurately below knock-out cup 54 of mechanism 50. There is a dwell interval for the mold plate at the knock-out position; see FIG. 7. With the filled cavity in this knock-out position 42A, pneumatic cylinder 52 is actuated to drive yoke 53 and cup 54 downwardly. This pushes the molded food patty from the cavity; the patty is driven downwardly onto takeaway conveyor 56. After the knock-out operation is completed, cylinder 52 lifts cup 54 clear of mold plate 41 and a machine cycle dwell occurs. In each machine cycle, cylinder 45 then pulls mold plate 41 back from the knock-out position 41A to the fill position, with cavity 42 over passage 37, to begin the next cycle of operation. In each cycle, cylinder 36 actuates food pump piston 34 to force additional meat product up through fill passage 37 and into mold cavity 42 when the mold cavity is at the fill position. During each operational cycle of food patty molding machine 20, paper interleaver 60 operates to interpose a single sheet of paper in the downward path of movement followed by each molded food patty discharged from mold cavity 42 at knock-out station 50.

Figure 3:
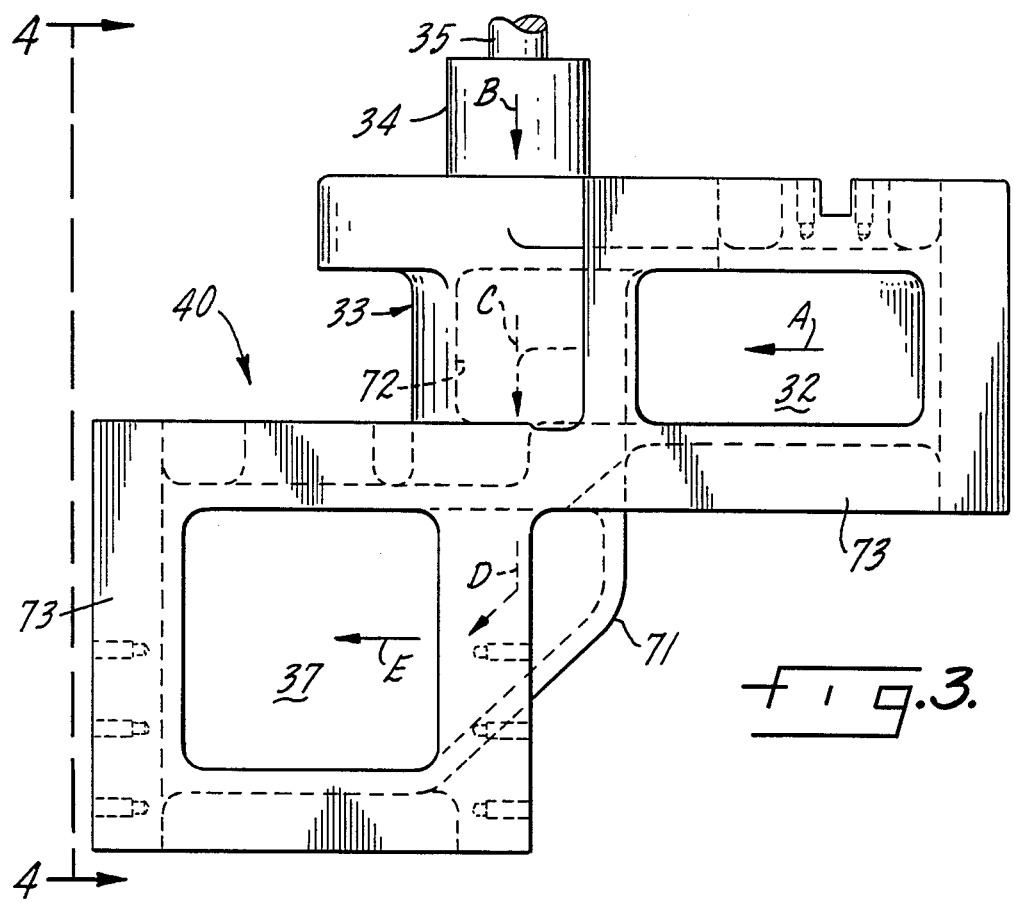
FIG. 3 is a plan view of the patty molding station of the machine of FIG. 1, on an enlarged scale.
Figure 4:
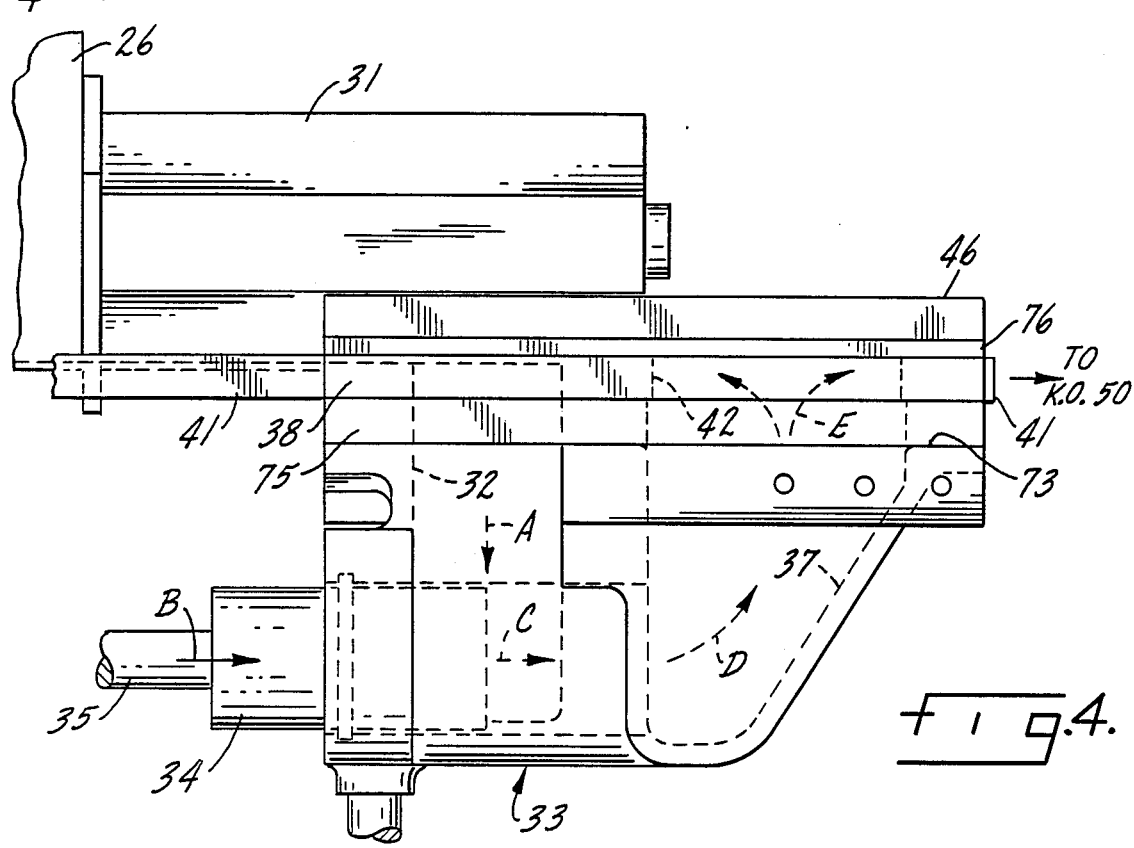
FIG. 4 a side elvation view, partly schematic, taken approximately as indicated by line 4—4 in FIG. 3.
Figure 5:
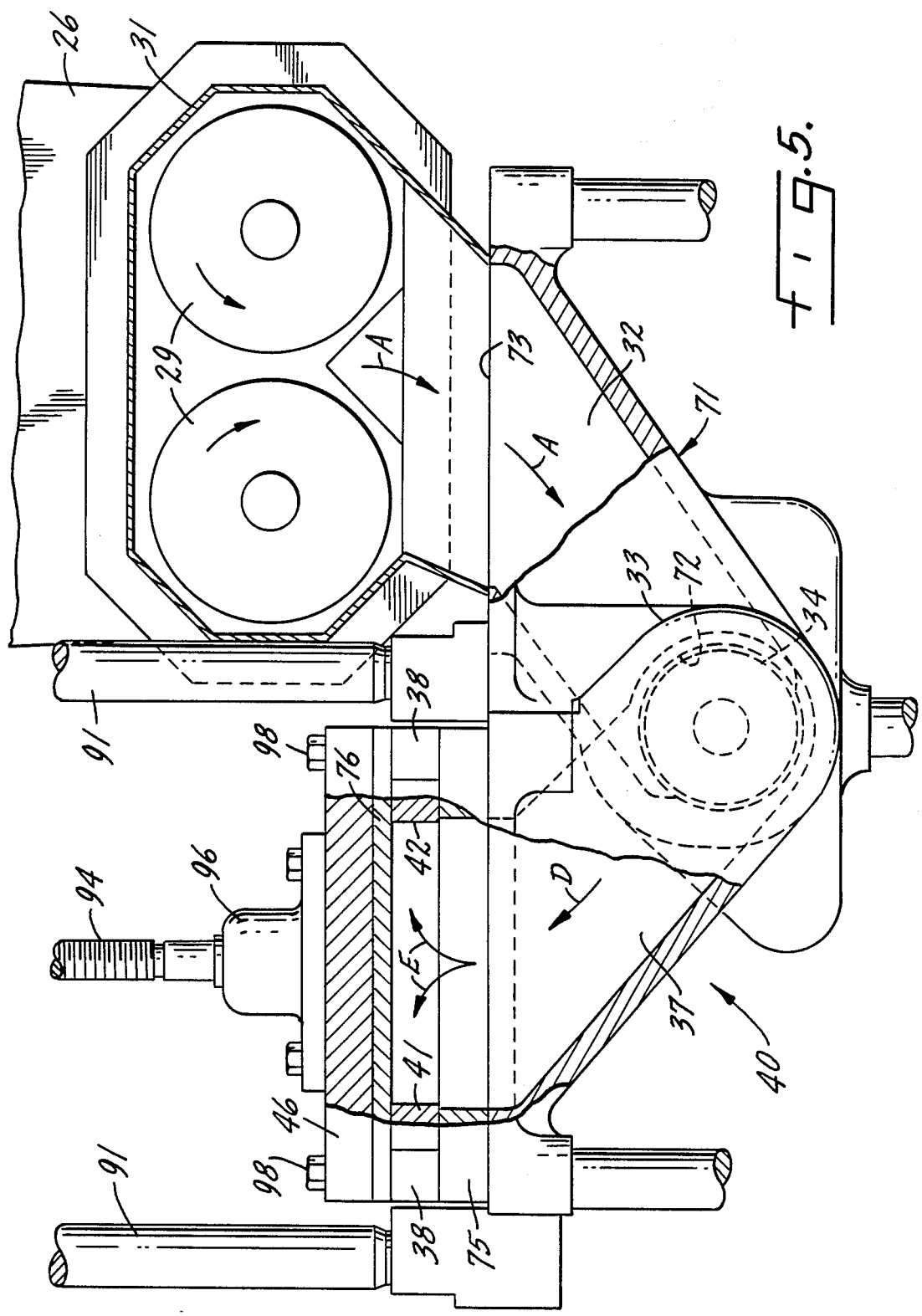
FIG. 5 is a front end elevation view, partly schematic of the patty molding station with portions cut away to reveal interior passages.

The improvement in molding station 40 of patty molding machine 20 that is afforded by the present invention is illustrated in substantial detail in FIGS. 3–5. As shown therein, feed passage 32 and fill passage 37 are preferably formed as internal passages in a casting 71 that includes a pump cylinder 72. Hopper extension 31 fits onto a flat horizontal flange 73 at one side of the top of casting 71. Feed passage 32 extends angularly down into the bore of the cylindrical pump body 72, into which pump plunger 34 projects as shown in FIGS. 3 and 4. Flange 73 encompasses the outlet of fill passage 37, which extends upwardly and outwardly from the bore of pump cylinder 72.

A fill plate 75 is affixed to the portion of flange 73 around the outlet of fill passage 37. Spacers 38 are mounted upon fill plate 73, with mold plate 41 supported on the fill plate between the spacers. Of course, spacers 38 should have a thickness closely matched to that of mold plate 41 to afford an appropriate sealing effect for mold cavity 42 while still allowing the necessary horizontal reciprocal motion of the mold plate as described above. The molding station includes a breather plate 76 which is supported on spacers 38 and the cover plate 46 positioned above plate 76. The cover, plates 46 and 76 cover mold plate 41 and its mold cavity 42. The mold cover 46,76 of machine 20 may have the structural attributes described in Richards U.S. Pat. No. 4,097,961 whereas fill plate 75 may incorporate the features set forth in Sandberg et al U.S. Pat. No. 4,356,595 or in Sandberg U.S. Pat. No. 4,372,008.

The basic operation of molding station 40 is as previously described. Ground meat, chicken, fish or other food product is impelled along the bottom of hopper 26 by feed screws 28 and is urged through hopper extension 31 into feed passage 32, as indicated by arrows A in FIGS. 4 and 5. When all of the continuous passage through casting 71, comprising feed passage 32, the bore of pump cylinder 72, and fill passage 37 is filled with food product, then each subsequent retract stroke of plunger 34 tends to produce a vacuum in the bore of pump 33 that draws additional food product down into the pump cylinder. During each cycle of operation of machine 20, plunger 34 is driven into cylinder 72 in the direction of arrow B (FIGS. 3 and 4) and places the food product in fill passage 37 under pressure, determined by the pressure applied at cylinder 35. This causes the food product to move through pump 33 and into fill passage 37 as indicated by arrow C in FIG. 4.

When mold plate 41 reaches its fill position, as shown in FIG. 3, with mold cavity 42 over the open outlet end of fill passage 37, the food product moves, under pressure, from the fill passage up through fill plate 75 and into the mold cavity; see arrows D and E in FIGS. 4 and 5. In this manner, a molded food patty is formed in cavity 42 and that food patty is subsequently discharged from the cavity when mold plate 41 moves to its knock-out position in a subsequent portion of the machine cycle (see FIG. 6).

Figure 6:
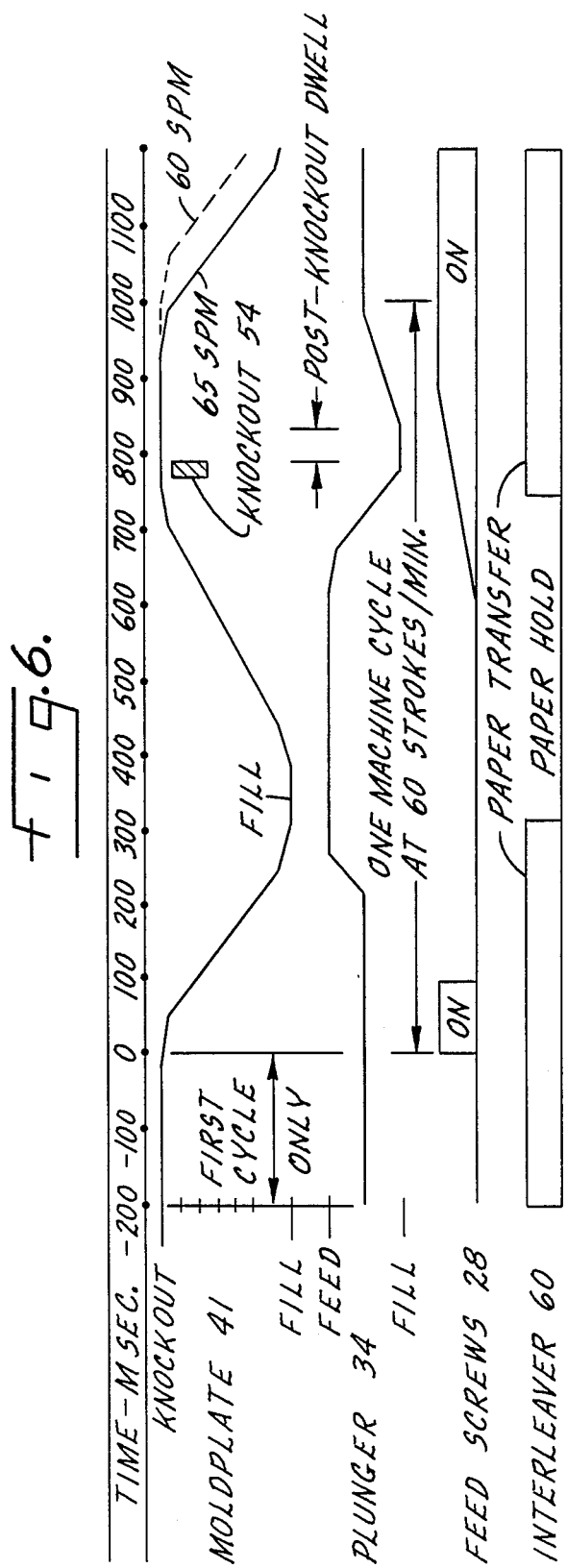
FIG. 6 is a timing chart for basic functions of the food patty molding machine.

As previously noted, patty molding machine 20 is a relatively small machine. Indeed, in the preferred construction, the usable width of mold plate 41 across its path of movement is about six inches so that the machine can produce only one patty of substantial size or two or three quite small patties in each cycle or stroke. Patty molding machine 20 need not be slow in its operation; as indicated in FIG. 6, the molding machine may function at a speed of sixty-five strokes per minute. Even higher speeds would be possible. On the other hand, machine operation can be slowed down substantially, to as low as about twenty-two strokes per minute, simply by increasing the post knock-out dwell interval indicated in FIG. 6. The use of hydraulic pressure motors, such as rotary motors 29 and linear motors 36, 45, and 52 throughout patty molding machine 20 makes it possible to effect this change without upsetting the timing relationships between any of the machine functions. In this manner, patty molding machine 20 is effectively adapted to operate over a broad range of cyclic speeds, a range that permits matching it with the speed requirements of other production equipment such as a cheese slice applicator, a packaging machine, a cuber or perforator, etc.

In any low volume machine, as previously noted, versatility is an important attribute. In patty molding machine 20 hopper 26 is displaced to the side of the machine, to a position at which it presents no interference with access to either of the cylinders 36 and 45, either of the drive rods 35 and 44, or either of the plunger 34 and mold plate 41. Furthermore, hopper 26 does not limit access to any part of molding station 40; it permits convenient and ready changeover of any or all of fill plate 75, spacers 38 and mold plate 41, breather plate 76, and cover plate 46 from above the machine, which is much easier than in any machine with a hopper, pump, or other components located over the mold plate.

Thus, unlike most prior horizontal reciprocal mold plate machines, the hopper of machine 20 presents no limitations on the versatility and changeover characteristics of the machine. Nevertheless, machine 20 has the same basic attributes as the large, high volume machines referred to above, as regards available operating pressure, speed of operation, special fill plate constructions, and the like, so that experimental work performed on the small machine translates into use on the large machines. It is also important that the pump plunger drive components 35 and 36 be horizontally and vertically displaced from the mold plate drive components 44 and 45. With both horizontal and vertical displacement between these portions of machine 20, access for maintenance or changeover purposes is greatly improved as compared with machines of more conventional construction.

The knock-out and mold lift assembly 55 is arranged to facilitate rapid changeover of mold plate 41, along with the necessary changes in knock-out cup 54, in patty molding machine 20. In the illustrated construction the lift assembly 55 comprises a pair of fixed vertical posts 91 disposed on opposite sides of the machine as shown in FIGS. 1 and 5. A fixed cross member 92 spans posts 91, as shown in FIG. 1. A hub 93 at the center of cross member 92 is internally threaded to receive an elongated screw 94 having a hand wheel 95 mounted on its upper end. The lower end of screw 95 comprises a connecting member or housing 96 engaging cover plate 46 (FIG. 5). The upper end of screw 94 is engaged by an arm 97 projecting from housing 51 of knock-out mechanism 50. The lower part of housing 51, which is preferably formed as a casting, also includes an engagement with housing 96 (not shown).

When the need arises for a changeover of mold plate 41 and the related knock-out cup or cups 54, the nuts 98 that maintain mold plate 41 between fill plate 75 and cover 76,46 are removed. When this has been done, hand wheel 95 is turned to rotate screw 94, lifting the connecting member 96 and simultaneously lifting housing 51 and the knock-out mechanism that it contains. In this manner, removal of mold plate 41 is made possible; it is also a simple and convenient matter to change knock-out cup 54 so that it will match the mold cavity in the new mold plate. Of course, if the mold plate change is from a single cavity to a plural cavity mold plate, or vice versa, a corresponding change of knock-out cup 54 is easily effected. A changeover of interleaver 60, if present, may also be necessary.

I claim:

1. In a food patty molding machine of the kind comprising a storage hopper for storing a quantity of a moldable food material, hopper feed means for urging the food material from the storage hopper into a feed passage, piston-type pump means including a plunger and a plunger drive for reciprocally moving the plunger along a predetermined pump plunger path, for receiving the food material from the feed passage, and pumping the food material into and through a fill passage, a mold plate, and mold plate drive means for moving the mold plate cyclically and reciprocally along a predetermined generally horizontal mold plate path between a fill position and a knock-out position, the mold plate having at least one mold cavity for receiving food material pumped thereinto from the fill passage when the mold plate is in its fill position, the improved construction in which:

the pump plunger path is located below and generally parallel to the mold plate path and is horizontally displaced from the mold plate path;

and the fill passage extends angularly upwardly from the output end of the pump plunger path to the fill position of the mold plate path, in a direction transverse to the mold plate path, so that the mold plate path is clear of the pump plunger path for vertical and horizontal access to both.

2. A food patty molding machine acording to claim 1 in which:

the hopper is positioned above the pump plunger path and is horizontally displaced from the pump plunger path in the same direction that the pump plunger path is displaced from the mold plate path, so that the hopper is clear of the pump plunger path, the plunger drive, the mold plate, and the mold plate drive means.

3. A food patty molding machine according to claim 2 in which:

the molding machine further comprises a knock-out mechanism aligned with the mold plate knock-out position and a takeaway conveyor below and aligned with the knock-out position of the mold plate;

and in which the hopper feed means, the pump plunger drive, the mold plate drive means, the knock-out mechanism, and the takeaway conveyor are all actuated by fluid pressure drive motors so that the patty molding machine may be adjusted to operate over a broad range of cyclic rates with the actual cycle remaining constant.

4. A food patty molding machine according to claim 3 in which:

the hopper feed means comprises a pair of counterrotating feed screws each driven by a hydraulic motor;

the pump plunger drive and the mold plate drive means each comprise a hydraulic cylinder; and the takeway conveyor is driven by a hydraulic motor.

5. A food patty molding machine according to claim 3 in which:

the molding machine further comprises paper interleaver means, aligned with the mold plate knock-out position, for engaging a separate sheet of paper with each patty from the machine, and in which the interleaver is actuated by the mold plate and by fluid pressure means utilized to drive the knock-out mechanism.

* * * * *